United States Patent [19]
Furlani et al.

[11] Patent Number: 5,793,519
[45] Date of Patent: Aug. 11, 1998

[54] MICROMOLDED INTEGRATED CERAMIC LIGHT REFLECTOR

[75] Inventors: Edward P. Furlani, Lancaster; William J. Grande, Pittsford; Syamal K. Ghosh, Rochester, all of N.Y.

[73] Assignee: Eastman Kodak Company, Rochester, N.Y.

[21] Appl. No.: 749,715

[22] Filed: Nov. 15, 1996

[51] Int. Cl.$^6$ .................................................. G02B 26/00
[52] U.S. Cl. .................... 359/291; 359/290; 359/292; 359/224; 359/230; 264/657
[58] Field of Search ........................ 359/290, 291, 359/292, 295, 254, 262, 224, 226, 230, 846; 257/434, 432; 264/657

[56] References Cited

U.S. PATENT DOCUMENTS

| | | | |
|---|---|---|---|
| 3,544,201 | 12/1970 | Fowler et al. | 359/224 |
| 4,450,458 | 5/1984 | Araghi et al. | 359/291 |
| 4,492,435 | 1/1985 | Banton et al. | 359/230 |
| 4,717,893 | 1/1988 | Ooi | 359/262 |
| 4,786,149 | 11/1988 | Hoenig et al. | 359/290 |
| 4,793,697 | 12/1988 | Wu | 359/254 |
| 4,805,038 | 2/1989 | Seligson | 359/290 |
| 5,172,262 | 12/1992 | Hornbeck | 359/230 |
| 5,411,690 | 5/1995 | Ghosh et al. | 264/657 |
| 5,424,866 | 6/1995 | Kikinis | 359/292 |
| 5,579,151 | 11/1996 | Cho | 359/291 |

OTHER PUBLICATIONS

Larry J. Hornbeck. *Digital Light Processing and MEMS: Timely Convergence for a Bright Future*, pp. 3-21, 23-24 Oct. 1996.

Kurt E. Petersen. *Silicon as a Mechanical Material*, pp. 39-73, May 1982.

Edward P. Furlani et al, US Patent Application entitled "Radiation Reflector", filed 21 Nov. 1996.

*Primary Examiner*—Loha Ben
*Attorney, Agent, or Firm*—Mark G. Bocchetti

[57] ABSTRACT

A micromolded integrated ceramic light reflector which can be totally integrated with drive and control electronics embedded on the same substrate for use with image projection systems. Each light reflector can be molded to a size on the order of less than one (1) mm$^3$ using the method of the present invention. Each light reflector includes a ceramic base element with a cavity and one surface thereof. A beam extends from one end of the cavity and cantilevers out therefrom above the cavity. The beam is made from the same ceramic as the base element and is coated with an electrically conductive ceramic coating which is also a good reflector of the visible radiation spectrum. The base of the cavity is coated with the same electrically conductive ceramic, or with a metallic coating. In either case, the coating is electrically grounded. When the beam is in its normal, undeflected position, light incident on the top surface of the beam reflects at a first angle. When a potential is applied to the activation electrode, the beam is deflected downward into the cavity. In this position, light incident on the beam reflects at a second angle. Thus, control of the light output to a given surface over a small spot (pixel) is achieved by controlling the potential across the ceramic light reflector.

32 Claims, 5 Drawing Sheets

MICROMOLDED INTEGRATED CERAMIC LIGHT REFLECTOR

BACKGROUND OF THE INVENTION

1. Field of the Invention

The present invention relates generally to light reflectors and, more particularly, to micromolded ceramic light reflectors for use in image projection systems.

2. Brief Description of the Prior Art

Conventional electromagnetic light reflectors consist of flexible members that move relative to an incident light beam to reflect light at a predefined angle. For magnetically based devices, the movement of the reflector is usually due to interactions of energized coils with permanent magnets arranged in close proximity to one another. For electrostatically based devices, the movement of the reflector is usually due to the interactions of the charged electrodes arranged proximate to one another.

Texas Instruments produces a Digital Micromirror Device™ (DMD) wherein each DMD pixel is a monolithically integrated MEMS (microelectromechanical systems) superstructure cell fabricated over a CMOS SRAM cell. Plasma etching a sacrificial layer develops air gaps between the metal layers of the superstructure of the silicon chip. The air gaps free the structure to rotate about two compliant torsion hinges. The mirror is connected to an underlying yoke which in turn is suspended by two thin torsion hinges to support posts. The yoke is electrostatically attracted to the underlying yoke address electrodes. The mirror is electrostatically attracted to mirror address electrodes. The mirror and yoke rotate until the yoke comes to rest against mechanical stops that are at the same potential as the yoke.

A DMD cantilever mirror approach has also been used where the MEMS structure was monolithically integrated over a silicon address circuit. The cantilever beam can apparently be created through controlled anisotropic undercut etching of the silicon wafer.

The substrate generally used in the prior art for the production of light reflectors for image transmission is silicon. This requires great care in accurately etching each substrate element in order to produce the desired light reflection. Heretofore, the prior art has failed to teach any means for molding light reflectors for projection displays as opposed to etching. In such manner, the prior art did not lend itself to automated mass fabrication of light reflectors enabling the reduction in unit cost along with improved reliability.

SUMMARY OF THE INVENTION

It is, therefore, an object of the present invention to provide a light reflector which can be produced by micromolding of ceramics.

It is a further object of the present invention to provide a micromolded integrated ceramic light reflector.

Another object of the present invention is to provide a micromolded integrated ceramic light reflector which can be produced by automated mass fabrication methods.

Yet another object of the present invention is to provide a micromolded integrated ceramic light reflector which can be totally integrated with drive and control electronics embedded on the same substrate.

Still another object of the present invention is to provide an integrated ceramic light reflector of reduced size on the order of less than one (1) mm$^3$.

Another object of the present invention is to provide a method for micromolding integrated ceramic light reflectors.

Briefly stated, the foregoing and numerous other features, objects and advantages of the present invention will become readily apparent upon reading and review of the detailed description, claims and drawings set forth herein. These features, objects and advantages are accomplished by molding a ceramic base element with a cavity and one surface thereof. A beam extends from one end of the cavity and cantilevers out therefrom above the cavity. The beam is made from the same ceramic as the base element and is laminated with an electrically conductive ceramic layer or ribbon which is also a good reflector of the visible radiation spectrum. The base of the cavity is laminated with an electrically conductive ceramic, and the laminate at the base of the cavity is electrically grounded. When the beam is in its normal, undeflected position, light incident on the top surface of the beam reflects at a first angle. When a potential is applied to the activation electrode, the beam is deflected downward into the cavity. In this position, light incident on the beam reflects at a second angle. Thus, control of the light output to a given surface over a small spot (pixel) is achieved by controlling the potential across the ceramic light reflector.

DETAILED DESCRIPTION OF THE PREFERRED EMBODIMENTS

Figure 1:
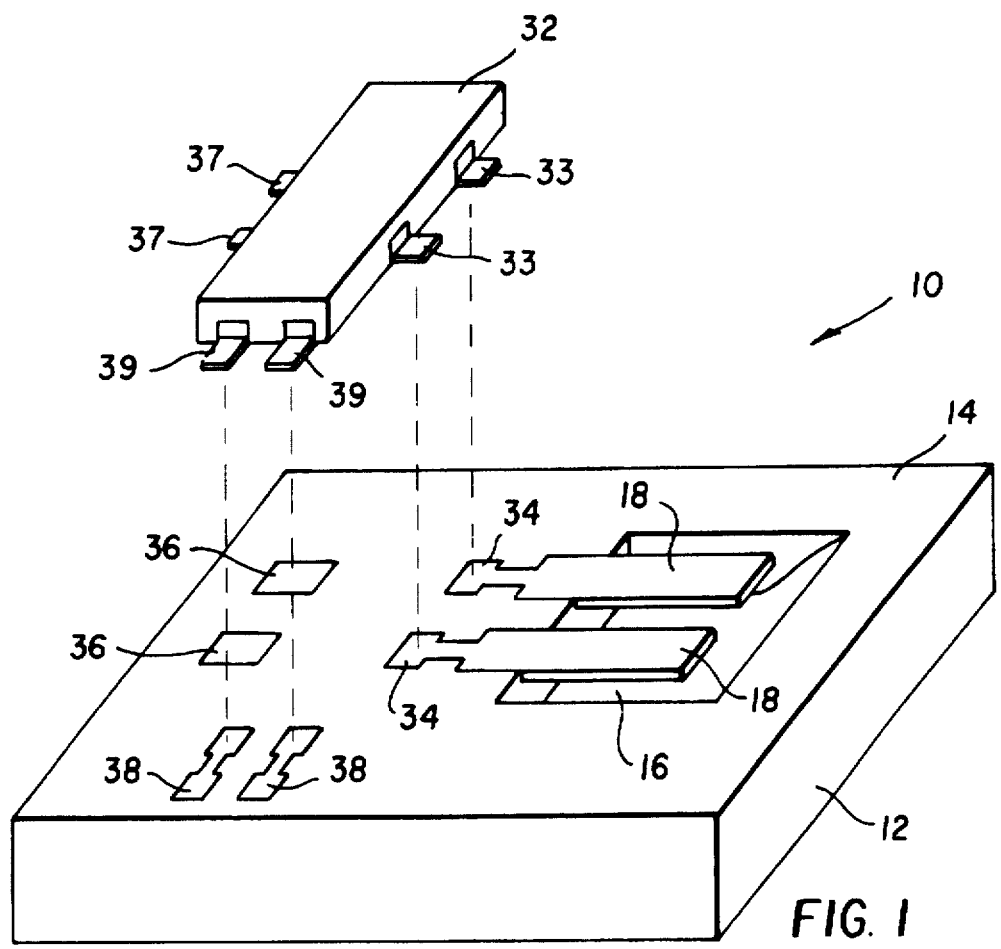
FIG. 1 is a perspective view of an exemplary micromolded integrated ceramic light reflector of the present invention.

Turning first to FIG. 1, there is shown a partially exploded perspective view of an exemplary micromolded integrated ceramic light reflector 10 of the present invention. The micromolded integrated ceramic light reflector 10 includes a ceramic base element 12 with an upper surface 14 having a cavity 16 molded therein. Extending from one end of cavity 16 is at least one beam 18 (FIG. 1 shows two beams 18). Each beam overhangs cavity 16 in cantilever fashion.

Figure 2:
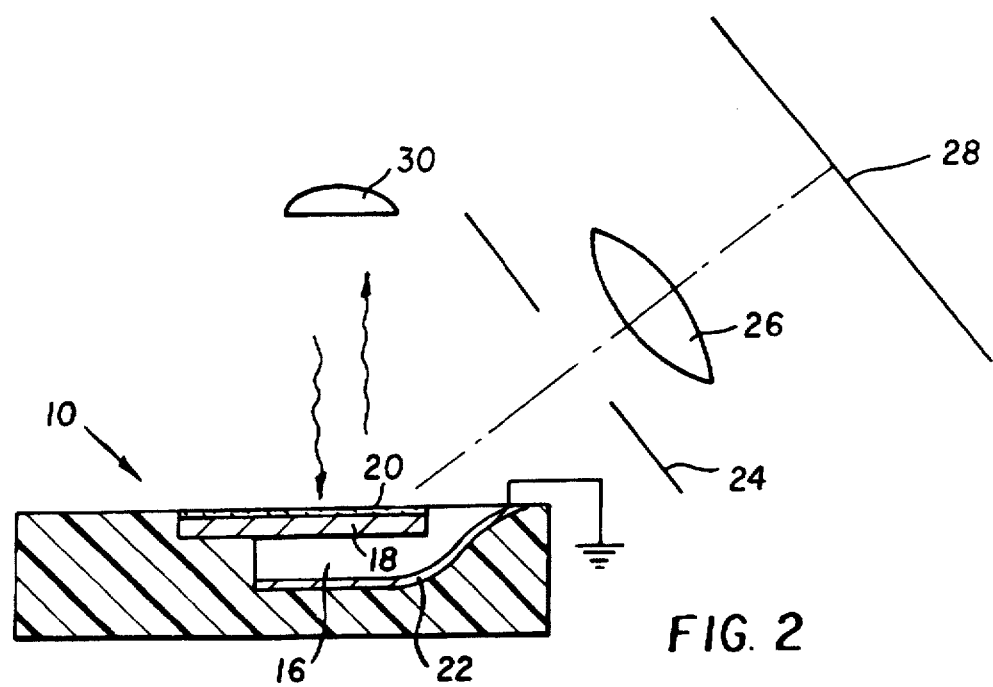
FIG. 2 is a partial section of the exemplary micromolded integrated ceramic light reflector of FIG. 1 shown schematically with image projection optics and a light source with the beam in an undeflected position.

Turning to FIG. 2, there is shown the reflector 10 of the present invention in cross section. The beam 18 overhanging cavity 16 is laminated with an electrically conductive ceramic layer or ribbon 20 which is also a good reflector of the visible radiation spectrum. The base of cavity 16 has a laminate conductor 22 thereon which is also a ceramic. Ribbon 20 is preferably formed by tape casting titanium nitride (TiN). Titanium nitride is both electrically conductive and optically reflective. Other electrically conductive ceramics can be used to create ribbon 20 such as titanium carbide (TiC), titanium boride (TiB$_2$), and boron carbide (B$_4$C). However, such ceramics are not good reflectors of light in the visible spectrum. Therefore, if such other ceramics are used for ribbon 20, it will be necessary to ribbon 20 with an optically reflective overlay such as gold, silver, or aluminum.

Laminate conductor 22 is also preferably formed by a tape casting process from an electrically conductive ceramic material. Because laminate conductor 22 does not have to be reflective of light in the visible spectrum, the ceramic used for generating laminate conductor 22 can be titanium carbide (TiC), titanium boride (TiB$_2$), boron carbide (B$_4$C), or other known electrically conductive ceramics. Ceramic ribbon 20 and laminate conductor 22 are both sintered in place at their respective locations on the reflector 10 as will be described more fully hereinafter.

Figure 3:
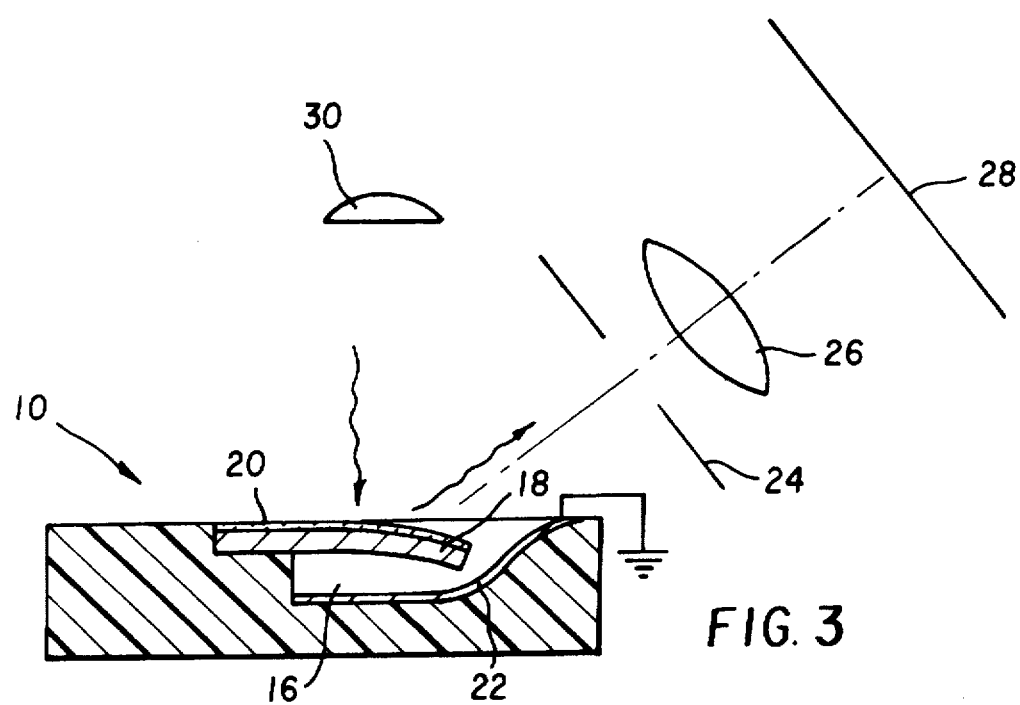
FIG. 3 is a partial section of the exemplary micromolded integrated ceramic light reflector of FIG. 1 shown schematically with image projection optics and a light source with the beam in a deflected position.

Referring to FIG. 3, the reflector 10 of FIG. 2 is shown in relationship to a light stop 24, lens 26 and display screen 28 depicted schematically. Light incident to ceramic ribbon 20 from light source 30 is perpendicular to the surface of beam 18 and, therefore, to ceramic ribbon 20 when beam 18 is in an undeflected position. Note that when beam 18 is in this undeflected position, no reflected light passes through the light stop 24 and through the lens 26 onto the display screen 28. When a potential is applied to ribbon 20 which serves as the activation electrode, ribbon 20 experiences an electrostatic attractive force to laminate conductor 22 at the base of cavity 16 which serves as the grounded electrode. This electrostatic attractive force causes beam 18 to deflect downwardly into cavity 16 as shown in FIG. 3. Note that when beam 18 is in the deflected position light from light source 30 incident on reflective ceramic ribbon 20 on the surface of beam 18 reflects at an angle such that the reflected light passes through light stop 24 and lens 26 and onto display screen 28. Thus, equating the micromolded reflector 10 of the present invention to a pixel, the reflector 10 of the present invention can be used to control the light output to a given surface for a single pixel. In such manner, the device of the present invention can be readily adapted for use with digital displays and printing applications.

A drive and control electronics package 32 (see FIG. 1) is affixed to the surface 14 of the base element 12. Terminals 33 extending from drive and control electronics package 32 are connected to a pair of conductor traces 34 on the surface of base element 12 by soldering. The pair of conductor traces 34 connect the drive and control electronics package 32 to ribbons 20 on beams 18. Also traced on the surface of base element 12 are conductors 36, 38 and power input terminals 38. Conductors 36, 38 are solder connected to control input terminals 37 and power input terminals 39, respectively, projecting from drive and control electronics package 32.

Those skilled in the art will recognize that the reflective as well as electrically conductive ribbon 20 will deflect with cantilevered beam 18. As such, if ribbon 20 was merely adhered to the surface of beam 18, the frequent deflection of beam 18 and ribbon 20 would stress ribbon 20 which could result in failure of ribbon 20 or delamination of ribbon 20 from the surface of beam 18. The potential for this type of failure is obviated by sintering ribbon 20 in place on the surface of beam 18 resulting in ribbon 20 becoming integrally connected to beam 18.

Figure 4:
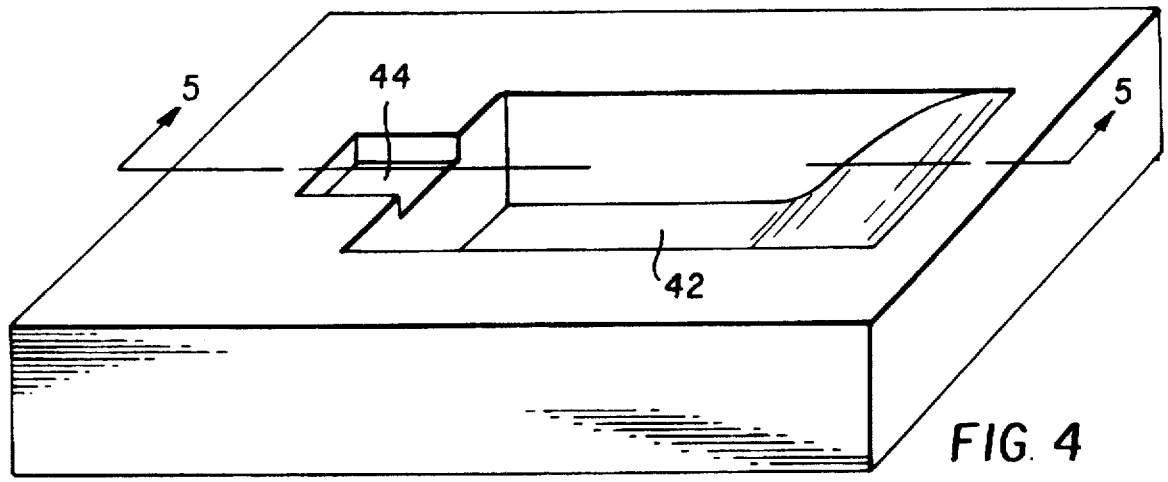
FIG. 4 is a perspective view of an exemplary micromolded ceramic light reflector base element.
Figure 5:
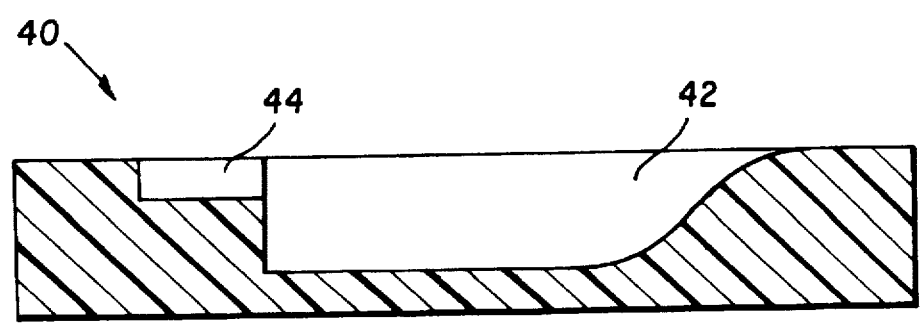
FIG. 5 is a sectional view of the micromolded ceramic light reflector base element taken along line 5—5 of FIG. 4.
Figure 6:
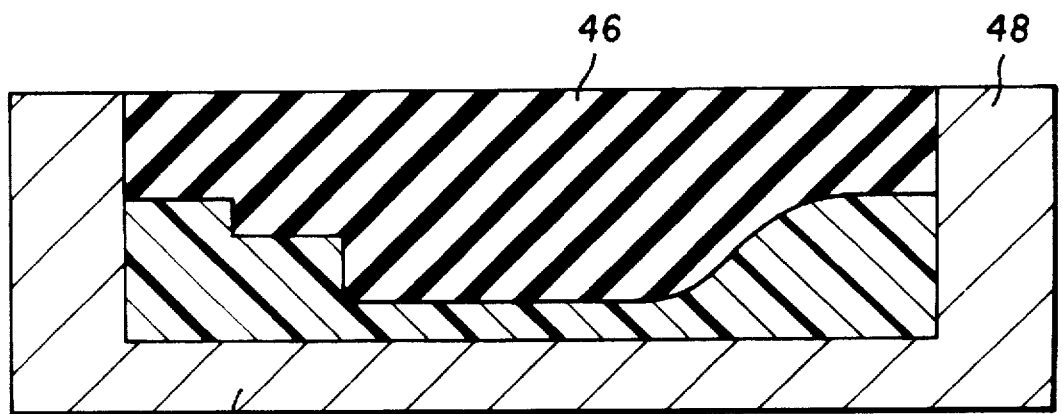
FIG. 6 is a sectional view of a molding apparatus used for generating a negative master.
Figure 7:
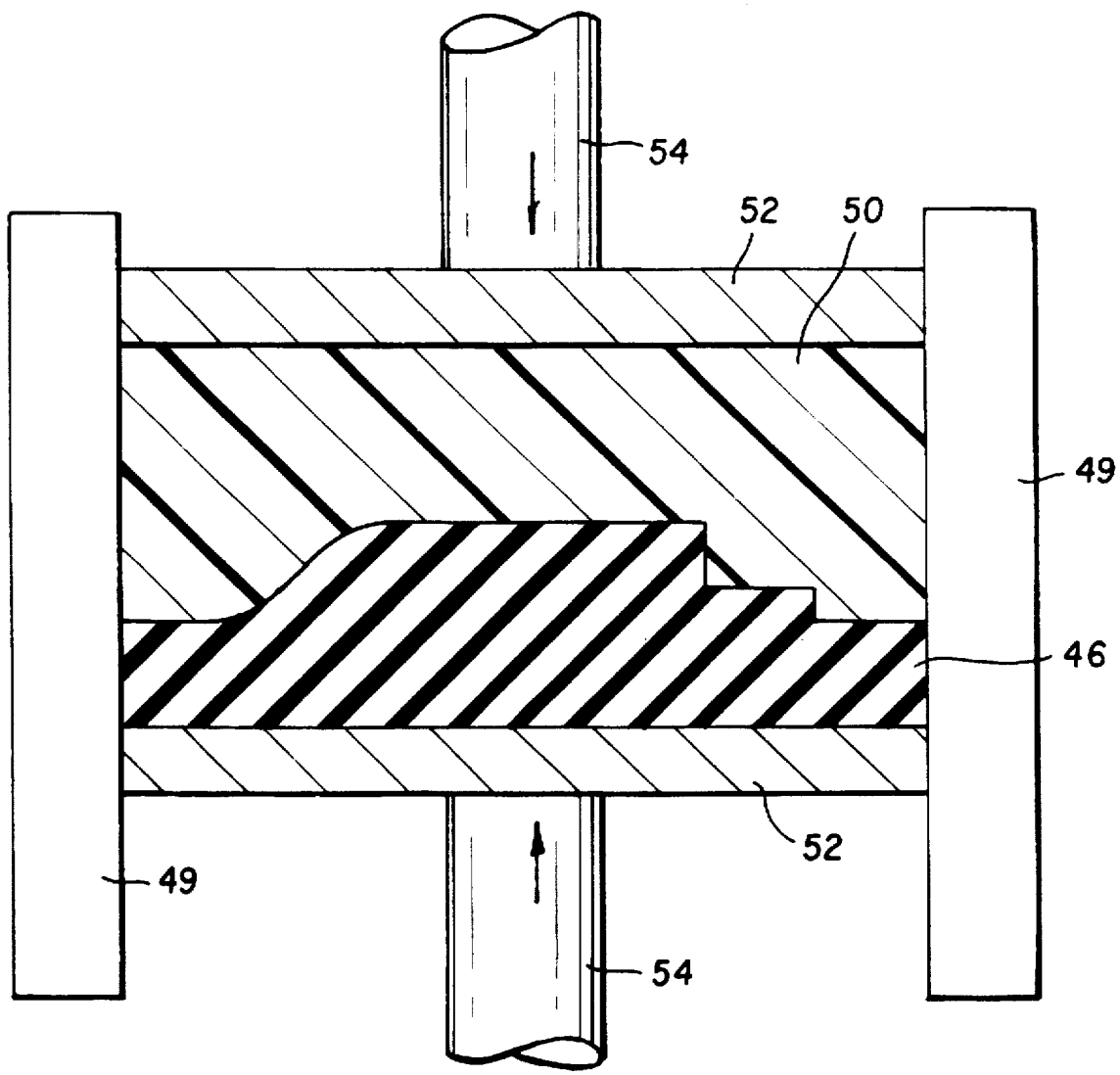
FIG. 7 is a sectional schematic of an apparatus for producing a micromolded ceramic light reflector base element using the negative master.

In order to micromold the light reflector 10 of the present invention, it is first necessary to fabricate a master mold device 40 (see FIGS. 4 and 5) using a silicon wafer and dry etching technology. Spatial micro features as small as 0.1 μm and having a depth ranging from about 2.0 μm to 100 μm can be etched on silicon wafers. Thus, the master mold device 40 duplicates the desired structural features (ranging in size down to 0.1 μm by 0.1 μm by 2.0 μm) for base element 12. Thus, master mold device 40 includes a cavity 42 (having approximate dimensions of 1 mm by 1 mm by 0.1 mm in depth) in the top surface thereof and a smaller recess 44 which is contiguous with cavity 42. A negative master 46 (see FIG. 6) is then produced by placing the silicon master 40 in a surrounding mold form 48. A silicone or silicone rubber, for example dimethylsiloxane or an RTV™ (a room temperature-vulcanizing silicone rubber compound), is used as the material from which the negative master 46 is produced. Such material replicates the micro features of master mold device 40 in great detail (down to 0.01 μm by 0.01 μm by 2.0 μm in size). The negative master 46 is then mounted in a metal die 49 (see FIG. 7) which is used to fabricate the base element 12 of the light reflector 10 of the present invention. A single base element 12, or alternatively, multiple base elements 12 can be molded simultaneously from the same mold cavity preferably using a dry pressing process or, in the alternative, a cold isostatic pressing process. Of course, in order to simultaneously mold multiple base elements 12, it will be necessary to produce an integral master mold device configured to yield a negative master which produces a sheet of integrally formed base elements 12. The sheet of integrally formed base elements 12 can then be cut into individual base elements 12.

The ceramic selected for micromolding the light reflector 10 of the present invention must be fabricated using very fine particles so that during the micromolding process, all of the intricate "micro features" of the reflector 10 are replicated with great precision. The term "micro features" as used herein is intended to mean those spatial features of an element or structure which have at least one dimension in the range of from about 0.1 μm to about 1000 μm. The term "micromolding" as used herein is intended to mean molding elements or structures which include spatial features having at least one dimension in the range of from about 0.1 μm to about 1000 μm. Spatial features with a minimum lateral size of as small as 0.1 μm and having a depth ranging from 0.1 μm to the silicon wafer thickness can be etched on silicon wafers and can be replicated by silicone rubber. Ceramic nano-particles ranging in size from about 0.01 μm to about 0.10 μm can be used to micromold these features. Titanium oxide (TiO$_2$) and calcium titanate (CaTiO$_3$) are examples of commercially available ceramic nano-particles which can be used to micromold spatial features in the 2.0 μm range. In order to micromold the light reflector 10 of the present invention, zirconia particles with an average particle size of 0.3 μm are used. This particle size allows for the replication through micromolding of features as small as 3 μm by 3 μm. In such manner, the structure of the silicon master mold device 40 can thereby be substantially duplicated.

The base element 12 of the ceramic light reflector 10 of the present invention is made from fine particles of zirconia (0.1 to 0.3 microns) alloyed with one or more secondary oxide powders such as, for example, yttria, ceria, calcia and/or magnesia. If yttria or calcia is selected, the range of mole percent thereof is from about 0.5 to 5.0. For magnesia, the range of mole percent thereof is from about 0.1 to about 1.0. The secondary oxides can be mixed either mechanically or, preferably, chemically by a coprecipitation process. The alloyed powder is then ball milled and spray dried with 2% to 5% by weight of an organic binder such as polyvinyl alcohol. Still referring to FIG. 7, the fine particulates of zirconia alloyed with secondary oxide powder are then poured into die 49 containing the negative master 46 made from, for example, an RTV™ having a Shore A hardness of 85, and pressed uniaxially at a pressure of preferably about 10,000 psi and not exceeding 15,000 psi by means of compression plates 52 mounted to rod members 54 to yield a green base element 50.

Figure 8:
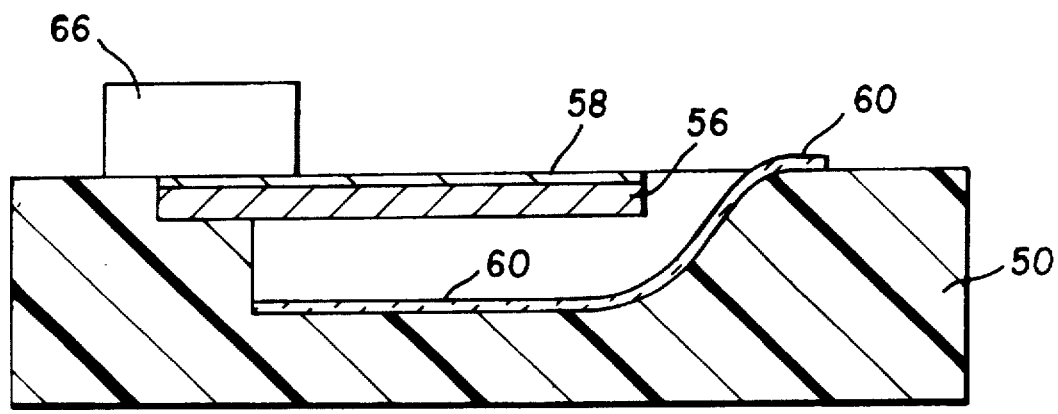
FIG. 8 is a sectional view of a green base element and green beam prepared for sintering.

As can be seen, the green base elements 50 are initially molded without the beams 18 in place. Separately molded green beams 56 are placed on the green base elements 50 prior to sintering as depicted in FIG. 8. Green beams 56 are molded separately via a dry pressing process or a tape casting process using the same alloyed ceramic zirconia powder used to fabricate the green base element 50. As with the green base element 50, one or more green beams 56 can be fabricated in a single cavity mold and then cut or sliced into single green beams 56 in the green stage. Once again, if yttria or calcia is selected, the range of mole percent thereof is from about 0.5 to 5.0. For magnesia, the range of mole percent thereof is from about 0.1 to about 1.0. The secondary oxides can be mixed either mechanically or, preferably, chemically by a coprecipitation process. It is important to alloy the ceramic powders in these ratios in order produce a tetragonal zirconia polycrystal structure. A tetragonal zirconia polycrystal structure (after sintering) allows beam 18 to exhibit the characteristics of good bending capability with resistance to fracture or fatigue failure. These characteristics are necessary given that each beam 18 may be called upon to cycle between an undeflected position and a deflected position millions of times during its life.

The green beam 56 is placed on the micromolded green base element 50 with one end of green beam 56 inserted into recess 44. A green ribbon or laminate 58 and a green laminate conductor 60, preferably made by tape casting an electrically conductive ceramic onto a Mylar® support web, are placed on green beam 56 and on the bottom surface of cavity 62, respectively, as shown in FIG. 8. The ceramic used in the tape casting process to produce green ribbon 58 and green laminate conductor 60 must be an electrically conductive ceramic material. In addition, ceramic used in the tape casting process to produce green ribbon 58 (which ultimately becomes ribbon 20 after sintering) must also have high reflectivity with respect to visible light. Green ribbon 58 is preferably formed by tape casting titanium nitride (TiN). Titanium nitride is both electrically conductive and optically reflective. Other electrically conductive ceramics can be used to create green ribbon 58 such as titanium carbide (TiC), titanium boride (TiB$_2$), and boron carbide (B$_4$C). However, such ceramics are not good reflectors of light in the visible spectrum. Therefore, if such other ceramics are used for ribbon 20, it will be necessary to provide ribbon 20 with an optically reflective overlay or coating after sintering. Providing a coating or overlay of gold, silver or aluminum after sintering will yield a workable, optically reflective surface to ribbon 20. However, coatings or overlays of gold, silver or aluminum, as opposed to laminates or ribbons of ceramic, will not have the advantage of becoming integral the ceramic beam after sintering. Green laminate conductor 60 is also preferably formed by a tape casting process from an electrically conductive ceramic material.

Because green laminate conductor 60 (which ultimately becomes laminate conductor 22 after sintering) preferably does not have high reflectivity of light in the visible spectrum, the ceramic used for generating green laminate conductor 60 can be one of a variety of known electrically conductive ceramics. Those electrically conductive ceramics include, for example, carbides such as titanium carbide (TiC), boron carbide (B$_4$C), and tungsten carbide (WC), borides such as titanium boride (TiB$_2$) and zirconium boride (ZrB$_2$), and silicides such as molybdenum silicide (MoSi$_2$) and niobium silicide (Nb$_2$Si$_5$), as well as other known electrically conductive ceramics.

Figure 9:
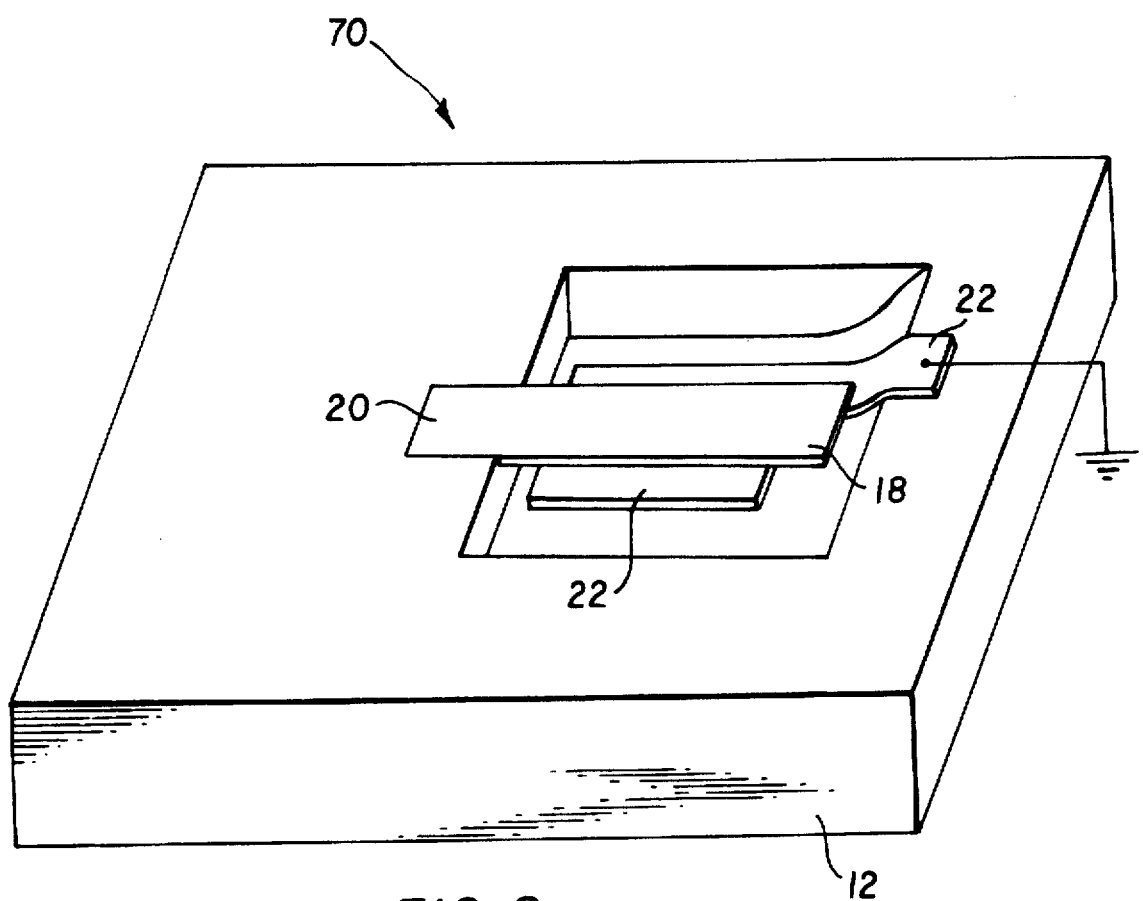
FIG. 9 is a perspective view of an exemplary micromolded sintered reflector body of the present invention.

Green beam 56 and green ribbon 58 should be fixtured such that movement of green beam 56 and green ribbon 58 relative to green base element 50 does not occur during the sintering process. Fixturing can be accomplished by using a weight 66 over that end of green beam 56 and green ribbon 58 residing in recess 44 (see FIG. 8). Weight 66 can be made from a piece of sintered oxide ceramic such as alumina, magnesia, or zirconia. The green base element 50, green beam 56, green ribbon 58, and green laminate conductor 60 are then sintered in air at 1500° C. for two hours to form the basic micromolded sintered reflector body 70 of the device 10 of the present invention, an example of which is depicted in Figure 9. The basic micromolded sintered reflector body 70 includes base element 12, beam 18, reflective and conductive ribbon 20, and electrically conductive laminate 22 which as a result of sintering are integrally connected. The preferred sintering schedule for sintering the green base element 50 and the green beam 56 is to sinter such green parts by sequentially:

(a) heating the green parts from about room temperature to about 300° C. at a rate of about 0.3° C./min.;

(b) heating the green parts from about 300° C. to about 400° C. at a rate of about 0.1° C./min.;

(c) heating the green parts from about 400° C. to about 600° C. at a rate of about 0.4° C./min.;

(d) heating the green parts from about 600° C. to about 1500° C. at a rate of about 1.5° C./min.;

(e) maintaining the green parts at about 1500° C. for about 120 minutes to form a sintered reflector body;

(f) cooling the sintered reflector body from about 1500° C. to about 800° C. at a rate of about 2° C./min.;

(g) cooling the sintered reflector body from about 800° C. to about room temperature at a rate of about 1.6° C./min. to form a ceramic micromolded reflector body.

Such sintering schedule is disclosed in U.S. Pat. No. 5,411,690 to Ghosh et al which is hereby incorporated by reference herein.

The powder employed in the present invention for forming base element 12 in its precompacted, presintered form comprises zirconium oxide alloyed with one or more secondary oxide powders as above stated. The powder should have certain properties in order to produce a ceramic of the invention consisting essentially of tetragonal phase, cubic and monoclinic phase-free, crystal grain structure. Particle size and distribution of the powder should be uniform, having an agglomerate size in the range of from about 30 μm to about 60 μm with an average of about 50 μm. "Agglomerate" can be defined as an aggregate of individual particles of the ceramic powder, and each particle may comprise multiple grains. Grain" can be defined as crystals, within the particle, having a spatial orientation that is unaligned with or distinct from adjacent grains. The grain size should be in the range of from about 0.1 μm to about 6 μm, with a preferred size of about 0.3 μm. The term "net shape" as used herein, e.g. as in net shape ceramic or net shape part, means that the ceramic is dimensionally true after sintering and therefore should not necessitate further machining prior to use in its intended working environment. In other words, the dimensions both of the green part and the ceramic are predictable in that the amount of shrinkage of the green part during sintering is predictable, producing a ceramic part that conforms to a predetermined shape and dimensions. The amount of shrinkage along any axis of the compacted powder form to that of the net shape ceramic should be less than about 0.001 percent in order to obtain close, predictable dimensional tolerances and produce the net shape ceramic of the invention. Such a part can then be put in its intended use without having to carry out a machining operation. Purity of the material should also be well controlled in the range of from about 99.9 percent to 99.99 percent by weight; that is, impurities should be present in the amount of no more than about 0.1 to about 0.01 percent by weight.

The moisture content of the powder should be maintained between about 0.2 to about 1.0 percent by volume of the powder when compacted. Too dry a powder can result in too porous a ceramic, and too high a moisture level can inhibit good release of the green parts from the mold surface. A preferred moisture content is about 0.5 percent.

The powder is compacted into a green part by means of a die press or the like. The term "green part" as used herein means the powder in its compacted, presintered state. The powder should be compacted by applying uniform compacting forces to the powder in order to produce a green part having a uniform density. A preferred compacting device that achieves uniform compacting forces is a floating mold die press. The green part should have a predetermined density selected by the operator to produce, after sintering, a net shape ceramic article. For example, for specific compositions of powder described herein, a preferred green part density is in the range of from about 3.2 g/cc to about 3.5 g/cc. The compaction pressure determines the density of the green part and consequently that of the ceramic. If the compaction pressure is too low, the ceramic can have a lower than desired density and not attain the desired net shape. If the compaction pressure is too high, the green part can delaminate and result in a ceramic that is defective for the intended use, e.g., for cutting. The compaction pressure for the above mentioned alloyed zirconia powders should be in the range of from about 10,000 psi to about 15,000 psi, and a preferred compaction pressure is about 12,000 psi.

The compaction time can be readily determined by the operator depending on the compaction pressure selected. Compaction time, for example, can be in the range of from about 60 seconds to 10 seconds for compaction pressures in the range of from about 10,000 psi to about 15,000 psi, respectively, and about 30 seconds for a compaction pressure of about 12,000 psi. To produce a net shape ceramic according to the invention, the compacting is carried out for a time sufficient to compact the powder to form a green part having a predetermined density for the selected powder, e.g., from about 3.0 g/cc to about 3.5 g/cc as above described. It is well known that the compaction pressure and time selected by the operator can be dependent on the size of the finished part. Generally, as the part size increases, compaction pressure and/or compaction time increase.

The powder is compacted in the presence of an organic water-soluble binder, such as polyvinyl alcohol, gelatin, or a polyester ionomer. The binder can be added to and mixed with the powder, for example, by spray drying or ball milling, prior to placing the powder in the compacting device.

Figure 10:
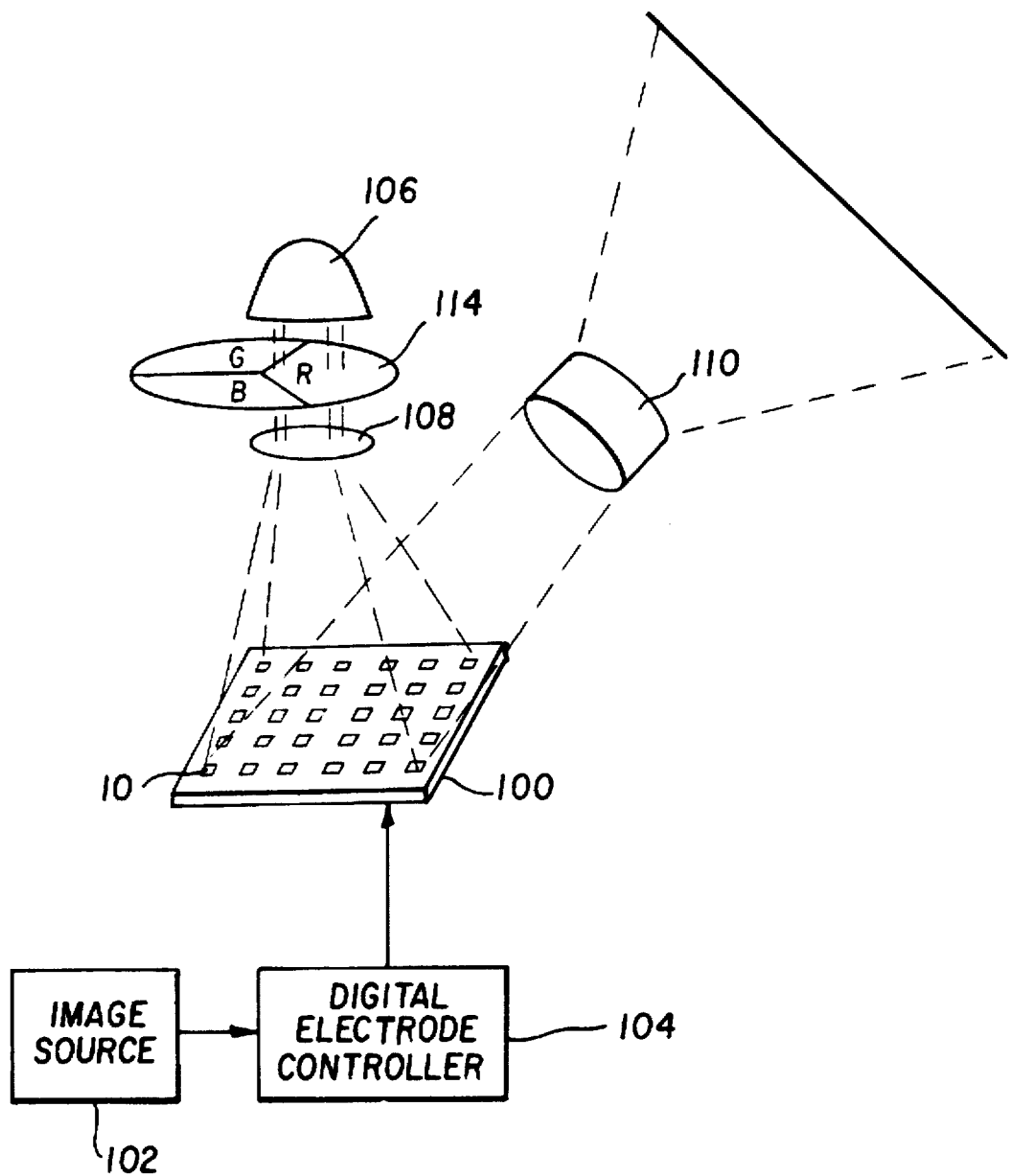
FIG. 10 schematically depicts an array of micromolded integrated ceramic light reflectors in an image projection system.

As shown schematically in FIG. 10, an array 100 of micromolded integrated ceramic light reflectors 10 can be used in an image projection system. An image source 102 is received by a digital electrode controller 104. Digital electrode controller 104 individually controls the voltage supplies to each of the light reflectors 10 of array 100. A light source 106 transmits light in the visible range through the appropriate optics 108 to be incident upon array 100. Through the control of the individual light reflectors 10, the light reflected off array 100 through projection lens 110 and onto display screen 112 produces the image on display screen 112 supplied to image source 102. A color filter 114 can be used to generate a color image.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A ceramic light reflector device comprising:
   (a) a ceramic micromolded base element including a cavity formed in a surface thereof, said cavity including a bottom face;
   (b) a ceramic beam integrally connected to said ceramic base element and cantilevered over said cavity;
   (c) a first ceramic laminate on a top surface of said beam, said first ceramic laminate being electrically conductive; and
   (d) an electrically conductive second laminate on said bottom face.

2. A light reflector device as recited in claim 1 further comprising:
   (a) a drive and control electronics package affixed to said base element; and
   (b) electrical conductor means connecting said drive and control electronics package to said first laminate on said top surface of said beam.

3. A reflector device as recited in claim 1 further comprising:
   means for grounding said electrically conductive second laminate on said bottom face.

4. A light reflector device as recited in claim 1 wherein:
   said micromolded base element and said beam are molded using fine particles of zirconia alloyed with at least one secondary oxide powder.

5. A light reflector device as recited in claim 4 wherein:
   said at least one secondary oxide powder is selected from the group consisting of yttria, ceria, calcia and magnesia.

6. A ceramic light reflector device as recited in claim 4 wherein:
   said micromolded base element and said beam are molded using fine particles of zirconia alloyed with yttria present in the range of from about 0.5 to 5.0 mole percent to yield tetragonal zirconia.

7. A ceramic light reflector device as recited in claim 4 wherein:
   said micromolded base element and said beam are molded using fine particles of zirconia alloyed with calcia present in the range of from about 0.5 to 5.0 mole percent to yield tetragonal zirconia.

8. A ceramic light reflector device as recited in claim 4 wherein:

said micromolded base element and said beam are molded using fine particles of zirconia alloyed with magnesia present in the range of from about 0.1 to 1.0 mole percent to yield tetragonal zirconia.

9. A ceramic light reflector device as recited in claim 1 wherein:

said first laminate on said top surface of said beam is integral with said beam.

10. A ceramic light reflector device as recited in claim 9 wherein:

said electrically conductive second laminate on said bottom face is integral with said micromolded base element.

11. A ceramic light reflector device as recited in claim 10 wherein:

said electrically conductive second laminate is selected from a group consisting of ceramic carbides, ceramic borides, and ceramic silicides.

12. A ceramic light reflector device as recited in claim 9 wherein:

said first laminate is titanium nitride.

13. A light reflector device as recited in claim 1 wherein: said first ceramic laminate is reflective of visible light.

14. A light reflector device as recited in claim 1 wherein: said ceramic micromolded base element and said ceramic beam have a tetragonal zirconia polycrystal structure.

15. A light reflector device as recited in claim 1 wherein: said first ceramic laminate is integrally connected to said ceramic beam.

16. A method for micromolding a ceramic light reflector comprising the steps of:

(a) etching a silicon wafer to generate a master mold;
(b) forming a negative master from a micro feature replicating material using said master mold;
(c) mounting the negative master in a die;
(d) placing a ceramic powder in the die;
(e) compression molding the ceramic powder to form a green base element with a cavity in one surface thereof;
(f) forming a green beam from the ceramic powder;
(g) supporting the green beam on the green base element such that the green beam is cantilevered over the cavity; and
(h) sintering the green beam and the green base element.

17. An electrostatic light reflector device comprising:

(a) a micromolded ceramic base element including a cavity formed in a surface thereof, said cavity including a bottom face;
(b) a ceramic beam sintered to said base element and cantilevered over said cavity;
(c) a first ceramic laminate sintered to a top surface of said beam, said first ceramic laminate being reflective of visible light and also being electrically conductive; and
(d) an electrically conductive second laminate sintered on said bottom face.

18. An electrostatic light reflector device as recited in claim 17 further comprising:

(a) a drive and control electronics package affixed to said base element; and
(b) electrical conductor means connecting said drive and control electronics package to said first ceramic laminate on said top surface of said beam.

19. An electrostatic light reflector device as recited in claim 17 further comprising:

means for grounding said electrically conductive second laminate on said bottom face.

20. An electrostatic light reflector device as recited in claim 17 wherein:

said ceramic micromolded base element and said ceramic beam are molded using fine particles of zirconia alloyed with at least one secondary oxide powder.

21. An electrostatic light reflector device as recited in claim 20 wherein:

said at least one secondary oxide powder is selected from the group consisting of yttria, ceria, calcia and magnesia.

22. A method for micromolding a ceramic light reflector comprising the steps of:

(a) etching a silicon wafer to generate a master mold;
(b) forming a negative master from a micro feature replicating material using said master mold;
(c) mounting the negative master in a die;
(d) placing a ceramic powder in the die;
(e) compression molding the ceramic powder to form a green base element with a cavity in one surface thereof;
(f) forming a green beam from the ceramic powder;
(g) forming a first green ribbon from an electrically conductive ceramic which reflects light in the visible spectrum;
(h) forming a second green ribbon from an electrically conductive ceramic;
(i) supporting the green beam and the first green ribbon on the green base element such that the green beam and the first green ribbon are cantilevered over the cavity; and
(j) sintering the green beam, the first green ribbon and the green base element.

23. A method as recited in claim 22 further comprising the step of:

placing the second green ribbon on a bottom surface of the cavity prior to said sintering step.

24. A method as recited in claim 22 wherein:

the ceramic powder is zirconia alloyed with at least one secondary oxide powder selected from the group consisting of yttria, ceria, calcia and magnesia.

25. A method as recited in claim 24 wherein:

the green beam and green base element have a tetragonal zirconia polycrystal structure after said sintering step.

26. A method as recited in claim 22 wherein:

said forming steps for forming the first and second green ribbons are performed by tape casting.

27. A method as recited in claim 22 wherein:

the ceramic powder used in said compression molding step and said step of forming the green beam is zirconia alloyed with magnesia present in the range of from about 0.1 to 1.0 mole percent to yield tetragonal zirconia.

28. A method as recited in claim 22 wherein:

the ceramic powder used in said compression molding step and said step of forming the green beam is zirconia alloyed with yttria present in the range of from about 0.5 to 5.0 mole percent to yield tetragonal zirconia.

29. A method as recited in claim 22 wherein:

the ceramic powder used in said compression molding step and said step of forming the green beam is zirconia alloyed with calcia present in the range of from about 0.5 to 5.0 mole percent to yield tetragonal zirconia.

30. A light reflector device comprising:
(a) a micromolded ceramic base element including a cavity formed in a surface thereof, said cavity including a bottom face;
(b) a ceramic beam sintered to said base element and cantilevered over said cavity;
(c) a first ceramic laminate sintered to a top surface of said beam, said first laminate being electrically conductive;
(d) an electrically conductive second ceramic laminate sintered on said bottom face.

31. A light reflector device as recited in claim 30 further comprising:
a coating on said first laminate, said coating having high reflectivity of light in the visible spectrum.

32. A light reflector device as recited in claim 30 wherein:
said first ceramic laminate is reflective of visible light.

* * * * *